United States Patent
Haag et al.

(10) Patent No.: US 9,889,895 B1
(45) Date of Patent: Feb. 13, 2018

(54) MOVABLE CRANE DOLLY

(71) Applicant: HAMMER HAAG TRAILERS, LLC, Clearwater, FL (US)

(72) Inventors: Constantin Haag, Clearwater, FL (US); Andrija Selak, St. Petersburg, FL (US); Ulises Vivanco Echevarria, Tampa, FL (US)

( * ) Notice: Subject to any disclaimer, the term of this patent is extended or adjusted under 35 U.S.C. 154(b) by 46 days.

(21) Appl. No.: 15/007,952

(22) Filed: Jan. 27, 2016

Related U.S. Application Data

(60) Provisional application No. 62/108,710, filed on Jan. 28, 2015.

(51) Int. Cl.
  *B60D 1/44* (2006.01)
  *B62D 63/08* (2006.01)

(52) U.S. Cl.
  CPC ............... *B62D 63/08* (2013.01); *B60D 1/44* (2013.01)

(58) Field of Classification Search
  CPC . B60D 1/44; B60P 3/125; B66C 23/76; B66C 23/00; B66C 25/00
  USPC ..................... 212/169, 175, 198, 79–80, 271
  See application file for complete search history.

(56) References Cited

U.S. PATENT DOCUMENTS

| | | | | |
|---|---|---|---|---|
| 1,328,048 A | * | 1/1920 | Knapp | B62D 63/08 280/408 |
| 1,965,367 A | * | 7/1934 | Brown | B66C 23/50 212/224 |
| 2,430,689 A | * | 11/1947 | Shook | B60P 3/00 198/801 |
| 2,883,129 A | | 4/1955 | MacIntyre | |
| 3,278,045 A | * | 10/1966 | Potter | B66C 23/72 212/178 |
| 3,302,806 A | * | 2/1967 | Brown | B66C 23/36 414/341 |
| 3,554,317 A | * | 1/1971 | Birbanescu | B66F 11/048 182/14 |
| 3,747,957 A | | 7/1973 | Noll | |
| 3,787,073 A | * | 1/1974 | Lievore | B62D 63/08 267/251 |
| 3,892,516 A | * | 7/1975 | McGrew | B28B 7/243 249/120 |
| 4,039,085 A | * | 8/1977 | Livengood | B66C 13/18 212/287 |
| 4,150,754 A | * | 4/1979 | Schmitt | B66C 23/54 212/300 |
| 4,165,005 A | * | 8/1979 | Jokinen | B66C 23/80 212/270 |

(Continued)

OTHER PUBLICATIONS

Nelson Manufacturing Co.; Boom Dolly :: Tandem, Tri-Axle, Widespread, Multi-Axle; <http://www.nelsontrailers.com/boomdollies.html> Printed Jun. 16, 2016.

*Primary Examiner* — Kevin Hurley
*Assistant Examiner* — Gabriela C Craciun
(74) *Attorney, Agent, or Firm* — Vorys, Sater, Seymour and Pease LLP; Mark A. Watkins

(57) ABSTRACT

An apparatus and method support a crane boom during its transportation. A crane dolly includes a trailer with a frame and a tower mounted on the frame. The tower is movable independent of the frame. A boom rest is attached to the tower and is configured to receive a portion of a crane boom. The boom rest may pivot with respect to the tower about at least a pivot point while the crane boom is transported with the crane dolly.

20 Claims, 7 Drawing Sheets

(56) References Cited

U.S. PATENT DOCUMENTS

| | | | | |
|---|---|---|---|---|
| 4,434,994 | A | | 3/1984 | Pepin |
| 4,731,916 | A | * | 3/1988 | Fix .......................... B66C 23/78 29/426.3 |
| 4,762,192 | A | * | 8/1988 | Maxwell ................... B60P 3/40 180/14.2 |
| 5,112,073 | A | * | 5/1992 | McGhie ................... B62D 7/04 280/404 |
| 6,478,427 | B1 | * | 11/2002 | Morris ................. B66F 11/048 248/123.11 |
| 7,413,393 | B1 | * | 8/2008 | Barnes ...................... B60P 3/40 280/404 |
| 7,478,834 | B2 | * | 1/2009 | Schlecht ................. B66C 23/42 280/763.1 |
| 7,637,512 | B1 | | 12/2009 | MgGhie et al. |
| 9,187,123 | B2 | * | 11/2015 | Sutton ...................... B60G 3/06 |
| 9,284,165 | B2 | * | 3/2016 | Willim ................... B66C 23/36 |
| 2003/0029825 | A1 | * | 2/2003 | Baxter, Sr. ............ B66C 23/201 212/179 |
| 2004/0057718 | A1 | * | 3/2004 | Chapman .............. B66F 11/048 396/428 |
| 2012/0313347 | A1 | * | 12/2012 | Schuettenberg ......... B60D 1/00 280/402 |
| 2015/0344086 | A1 | * | 12/2015 | Scarth ................... B62D 63/08 280/411.1 |

\* cited by examiner

MOVABLE CRANE DOLLY

CROSS-REFERENCE TO RELATED APPLICATIONS

This U.S. patent application claims priority to and the benefit of Provisional U.S. Patent Application Ser. No. 62/108,710 filed on Jan. 28, 2015, which is incorporated by reference herein in its entirety.

FIELD OF THE INVENTION

The current invention relates generally to apparatus, systems, and methods for transporting cranes. More particularly, the apparatus, systems, and methods relate to a crane dolly that supports one end of a crane during transportation.

BACKGROUND OF THE INVENTION

Modern cranes can be large in size requiring a main towing vehicle that supports the majority of the weight of a crane. Additionally, a boom support vehicle/trailer (crane dolly) is attached to the boom of a crane to support a portion of the weight of the boom when transporting the crane over roadways. The additional axles provided by the boom support vehicle bear some of the crane's heavy weight, thereby lowering the per axle load exerted on the roadway to a level which is within regulatory limits. The boom support vehicle also absorbs boom-related forces that result from the crane carrier and boom support vehicle going into and coming out of a turn. As cranes have increased in size, boom support vehicles are being modified to accommodate larger loads. For example, boom support vehicles may be equipped with hydraulic suspensions and better boom-to-vehicle connections for safer travel on highways at higher speeds. Typical boom support vehicles may include articulated front and rear dollies which have conventional axles. A dolly tower is often physically connected to the top surface of the boom support vehicle. What is needed is a better crane dolly.

SUMMARY

One embodiment is a crane dolly for supporting a distal end of a folded crane boom during its transportation. The crane dolly includes a trailer with a frame and a tower mounted on the frame. The tower is movable with respect to the frame. A boom rest is attached to the tower and receives a portion of a crane boom. The boom rest may pivot with respect to the tower about at least two axes while the crane boom is transported with the crane dolly In some configurations, the crane dolly further includes a rear bumper and wheels pivotally attached to a lower portion of the tower to allow, when necessary during transportation, the tower to roll back and forth between the front tongue and the rear bumper.

Another embodiment is a trailer that includes a tower frame, a front tongue, and a boom rest. The tower frame is located on the trailer and moves between a front end and a rear end of the trailer, as required during transportation of a crane boom. The front tongue is connected to the trailer and remains attached to the trailer when the trailer is transporting the crane boom. The boom rest is attached to a top of the tower frame and moves with respect to the tower frame and is adapted to receive a portion of the crane boom. In some embodiments, the crane boom may be locked to the boom rest during transportation of the crane boom.

Another embodiment is a method of using a crane boom dolly. The method begins by moving a tower on a trailer relative to the trailer in preparation for the tower to receive a crane boom. The crane boom is lowered onto the tower and optionally locked to the tower. A forward tongue of the trailer is connected to a towing vehicle. The forward tongue remains connected to the towing vehicle while the crane boom is being transported. The tower is permitted to move upon the trailer while the crane boom is being transported.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE DRAWINGS

Figure 1:
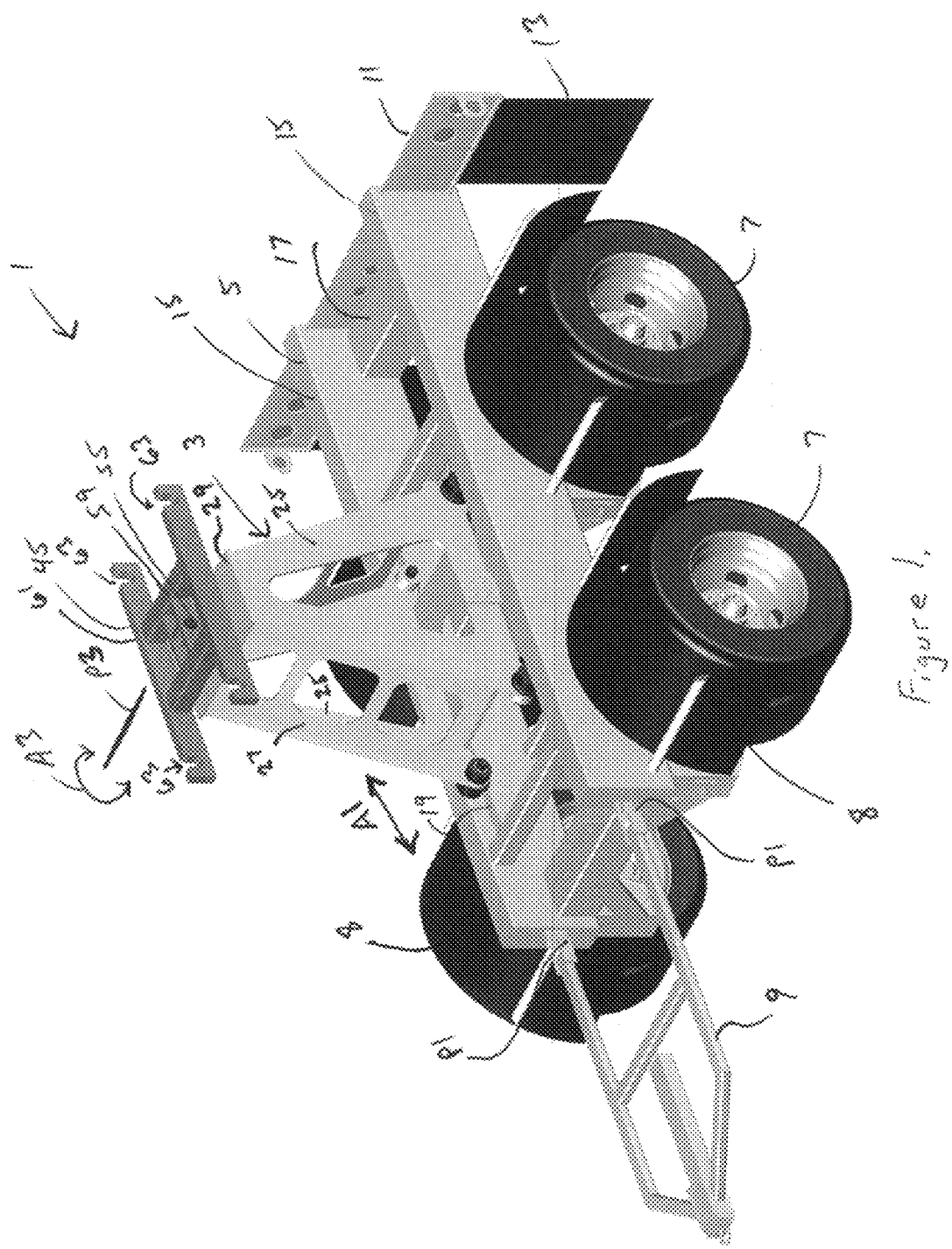
FIG. 1 illustrates a perspective view of a preferred embodiment of a crane dolly.

FIG. 1 illustrates one embodiment of a crane dolly 1. The crane dolly 1 is used to support a portion of the weight of a crane boom as a main towing vehicle transports a crane over roadways. This example of a crane dolly 1 includes a tower 3, a frame 5, wheels 7, a front tongue 9 (e.g., front towing hitch), as well as optional fenders 8, and a rear bumper 11 with mud-flaps 13. The crane dolly 1 may include other components such as a brake system, safety lights, and the like as understood by a person of ordinary skill in the art; however, these common components are not discussed herein.

Major components of crane dolly 1 such as tower 3, frame 5, front tongue 9, as well as the optional fenders 8 and rear bumper 11 are preferably made out of rigid material such as metal. In the preferred embodiment, these components may be made of steel and/or aluminum; however, other materials may be used.

"Rigid material" is defined herein as any material that retains its shape when formed and that is not a liquid or a gas. Rigid material may be pre-formed into specific shapes such as C-channel, box-channel, as well as square and/or rectangular tubing. For example, rigid materials include metal, steel, aluminum, plastics, wood, etc.

"Rigidly connected" is defined herein to mean connected together by welding, bolts, glue, clamps and/or connected together in another way as understood by a person with ordinary skill in the art so that the connected components do not move relative to each other.

An exemplary frame 5 includes two parallel elongated main beams 15 rigidly connected together by a variety of cross-members 17, as illustrated. Wheel assemblies, as well as air suspension systems, and other components may also be mounted onto frame 5. It is to be appreciated that any trailer/tracker frame construction sufficient to support the tower assembly of the present invention may be used. As defined and used herein, a trailer is motorized for driving itself, instead, it requires be connected to a motorized truck for transportation.

Forward tongue 9 is formed out of ridged material but its length is adjustable as described below. Tongue 9 includes two side arms 120 pivotally connected to the frame 5. A cross-member 122 spans between side arms 120 and is rigidly connected to them. Angled beams 124, 126 extend from font ends of side arms 120 and are rigidly connected to a tow beam housing 128. A towing beam 127 resides in the tow beam housing 128 and may be extended from this housing to create a tongue 9 of a desired length for a specific crane boom. When the desired length is set towing beam 127 can be locked into place with respect to tow beam housing 128 with locking bolts (not illustrated) or locked into place by any method as understood by those of ordinary skill in the art. A tow coupling 130 may be located on a front end of towing beam 127 allowing for a point of connecting the front tongue 9 to a towing vehicle. Of course, this is only one example of an adjustable length and other embodiments may include other adjustable length front tongues as understood by those of ordinary skill in the art.

Figure 5:
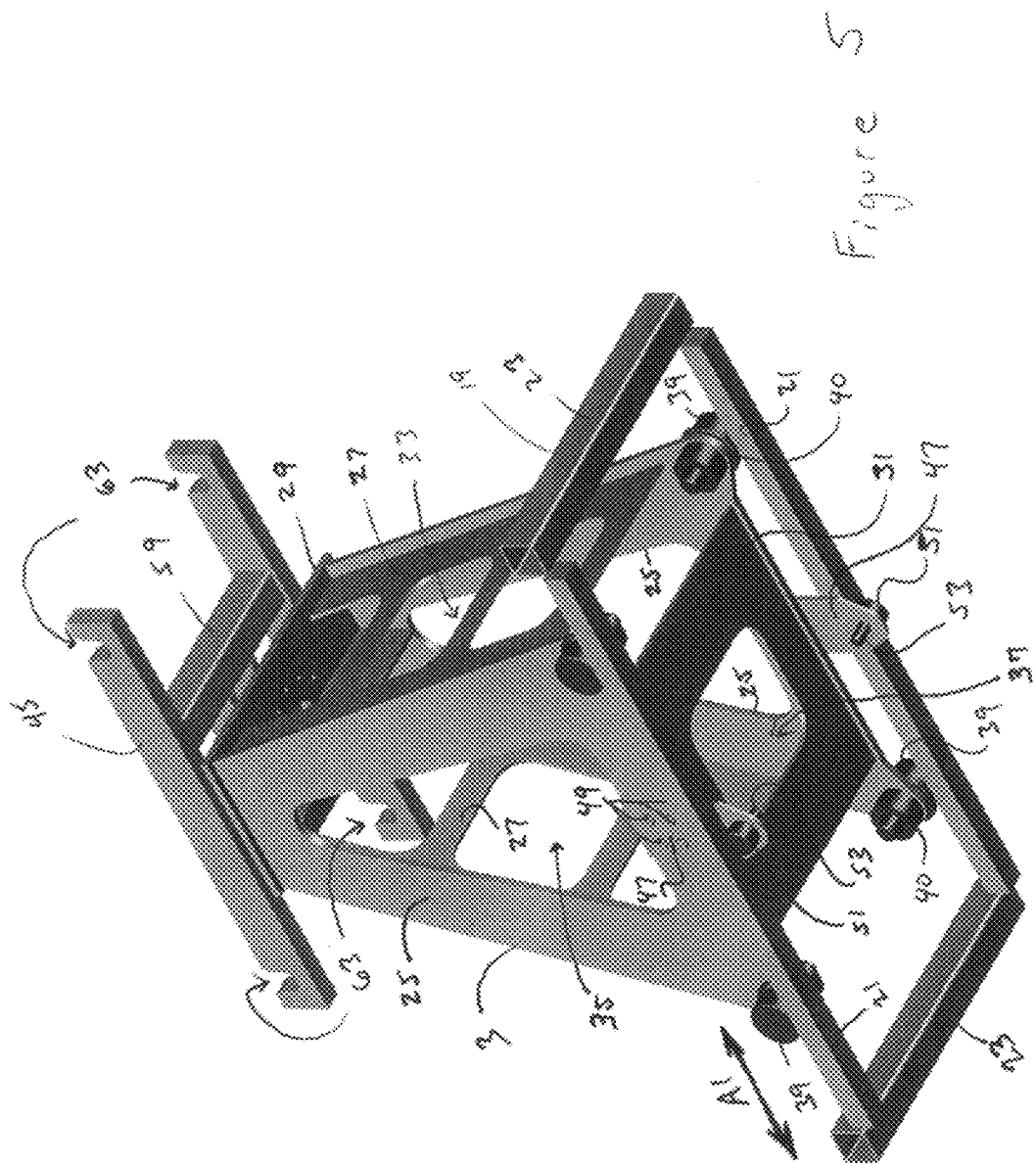
FIG. 5 illustrates another perspective view of the tower assembly.
Figure 6:
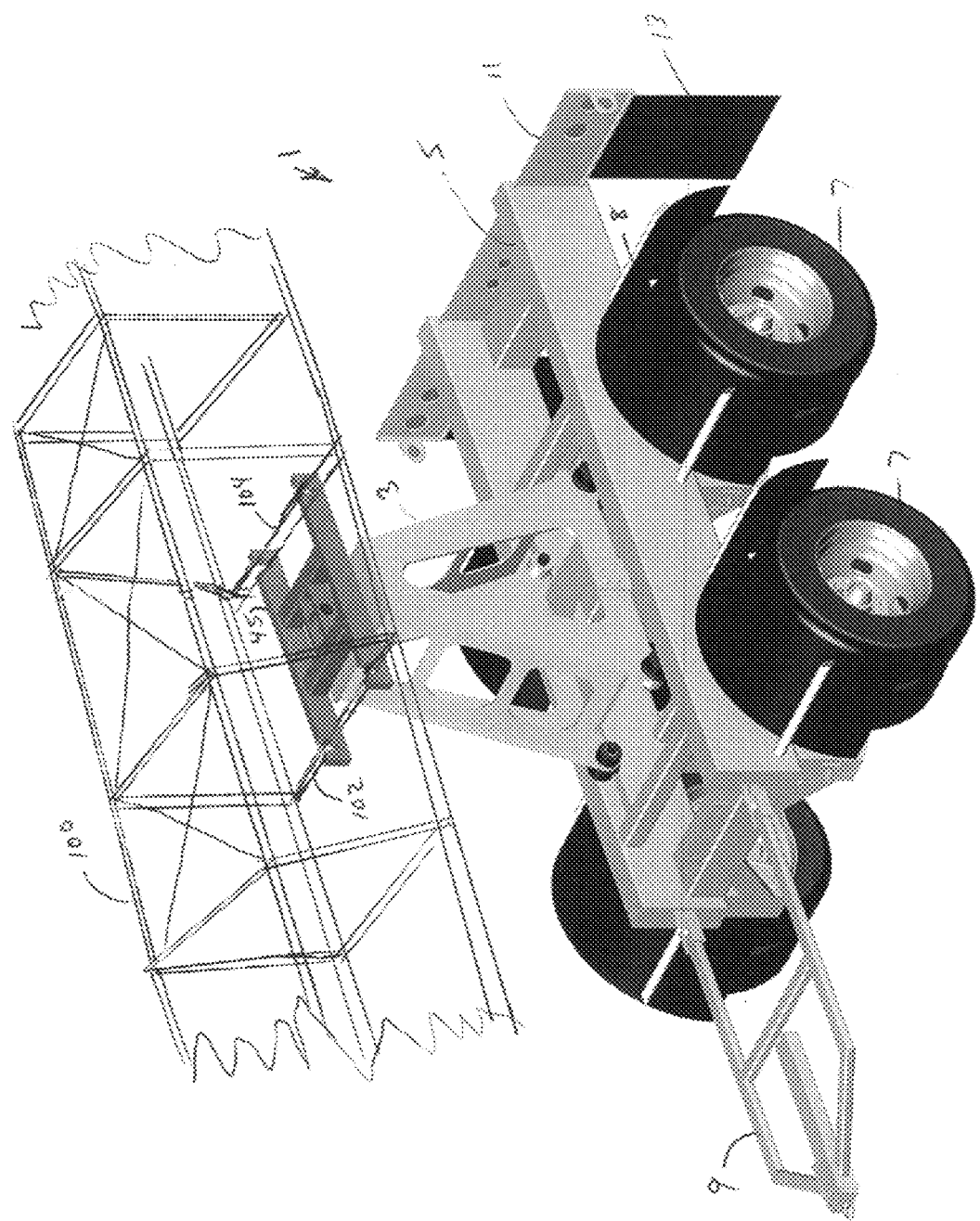
FIG. 6 illustrates a perspective view of the crane dolly with a crane boom attached to it.

Tower 3 is placed upon a tower guide assembly 19 that allows the tower 3 to move back and forth in the direction of arrow A1 (FIGS. 1 and 5). Tower guide assembly 19 has two rails 21 and two bumpers 23 made out of ridged material. Rails 21 and bumpers 23 may be rigidly connected to frame 5 and, in some embodiments, rails 21 and bumpers 23 may be connected to each other.

Figure 4:
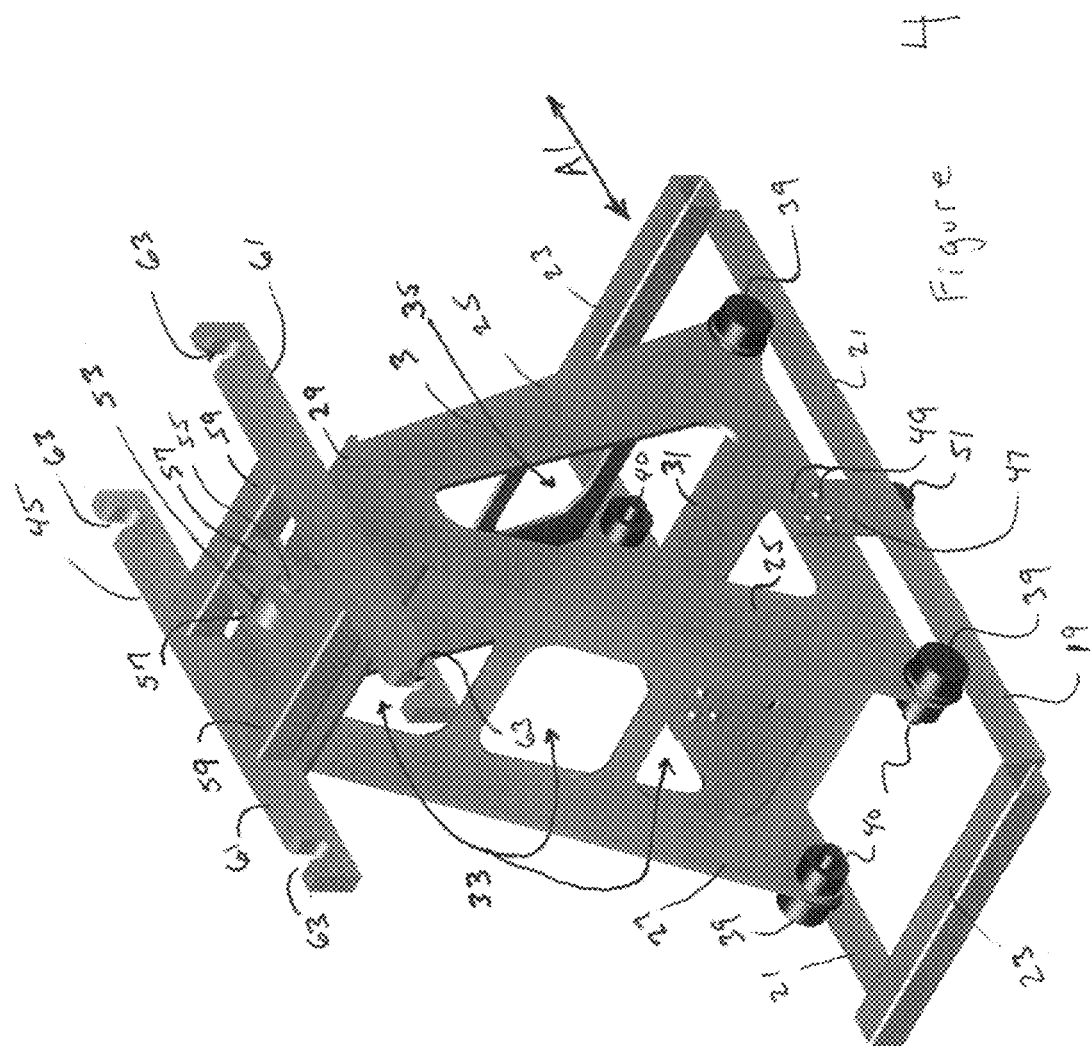
FIG. 4 illustrates a perspective view of a preferred embodiment of a tower assembly of the crane dolly.

An exemplary tower construction shows tower 3 is made out of rigid material and is generally A-shaped as viewed from the starboard and port sides of the dolly 1, as best seen in FIGS. 4 and 5. Tower 3 has side plates 25, front and back plates 27, a top plate 29, and a bottom plate 31. Side plates 25 are formed with openings 35, front and back plates 27 are formed with openings 33, and bottom plate 31 is formed with opening 37. These openings reduce the overall weight of tower 3 without compromising significant strength and also allow air to pass through them when a crane is being transported. In one embodiment, these components are formed out of flat pieces of steel or another rigid material. Side edges of front and back plates 27 are recessed inside of side edges of the side plates 25 where these plates are rigidly connected together. Top plate 29 overlaps side plates 25 as well as front and back plates 27 and top plate 29 is rigidly connected to side plates 25 and front and back plates 27 as positioned. Bottom plate 31 is rigidly connected to both side plates 25 in the position illustrated.

Another embodiment may include an equally preferable tower construction that is a ladder type construction utilizing rails (stringers) to provide vertical and angular support, combined with the equivalent of rungs and/or spreaders. While tower 3 is herein illustrated with a top dimension smaller that the base dimension, it is contemplated that in other embodiments that many other tower configurations and dimensions may be used that provide sufficient support for the crane boom consistent with the purposes described herein. The exact configuration or construction of tower 3 shall not be viewed as limiting.

Wheels 39 are attached to the lower corners of side plates 25 of tower 3. Wheels 39 allow tower 3 to roll back and forth in the direction of arrow A (FIGS. 1 and 5) with wheels 39 rolling upon rails 21. These wheels 39 may be rotatably secured to side plates 25 with wheel attachment devices 40, bolts, or in another way. In the preferred embodiment, rigid wheel tabs 47 are rigidly connected with bolts 49 to a bottom central portion of each side plate 25. Lower wheels 51 are attached at a lower end of each rigid wheel tab 47 with a bolt 53 or another wheel attachment device. These lower wheels 51 hang below rails 21 and travel along bottom edges of rails 21. The combination of upper wheels 39 and lower wheels 51 ensures that tower 3 cannot separate from frame 5 and rails 21. Other constructions such as rollers, bearings/bearing races, and other mechanisms which allow for the forward and aft travel of tower 3 relative to the frame 5 may be used in other configurations.

Figure 2:
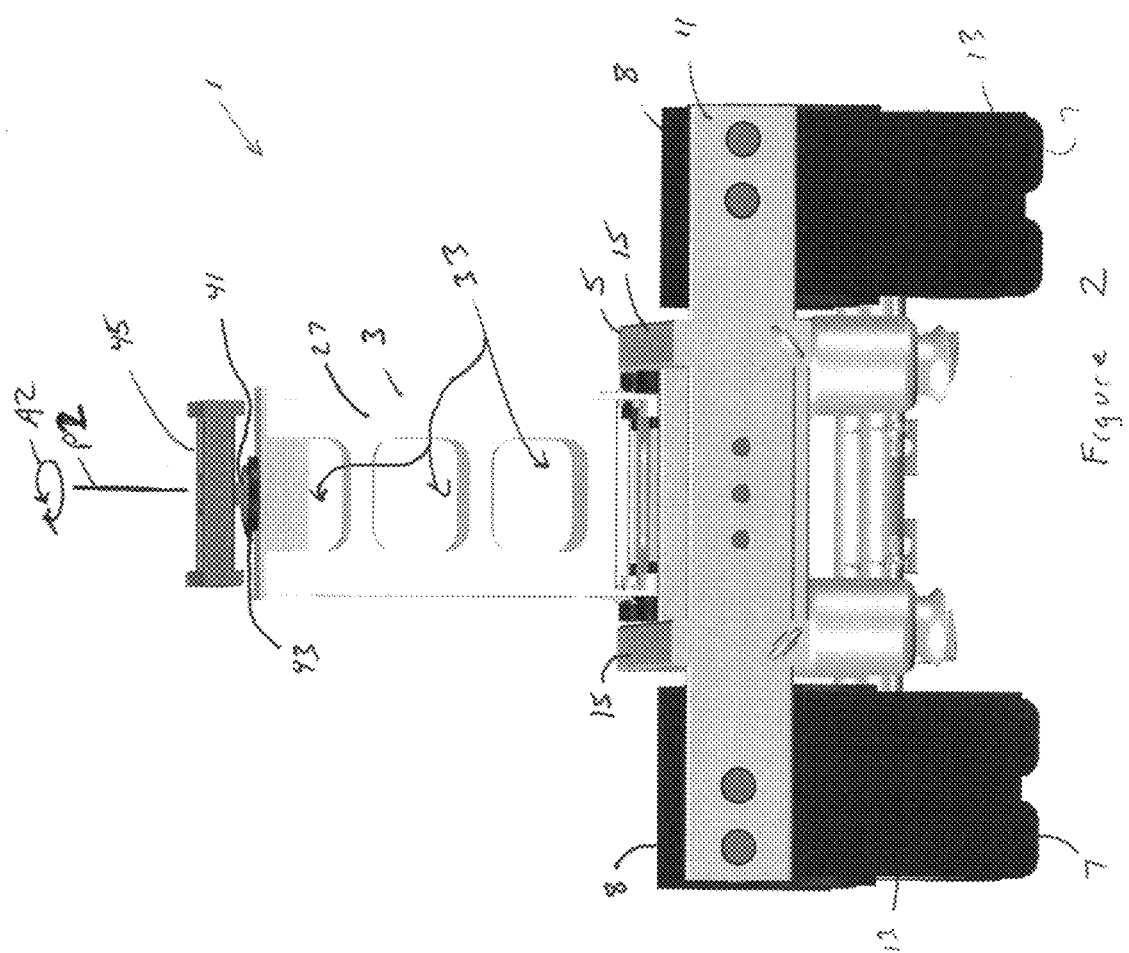
FIG. 2 illustrates a rear view of the crane dolly.
Figure 3:
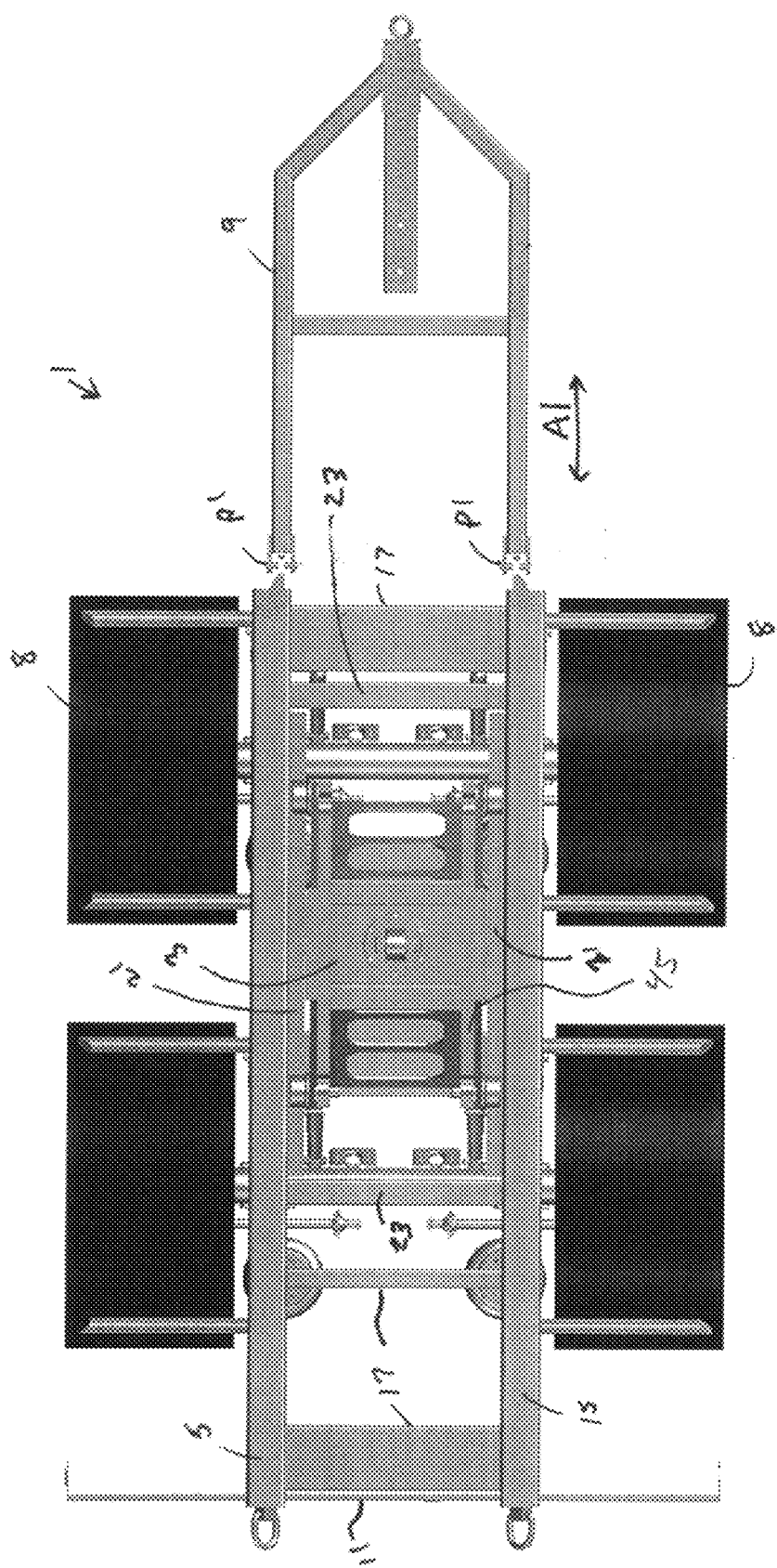
FIG. 3 illustrates a top view of the crane dolly.

A swivel assembly 41 is attached to the top plate 29 via a support mechanism 43. Swivel assembly 41 connects to a boom rest 45. Support mechanism 43 is fixedly attached to top plate 29 for allowing swivel assembly 41 and/or boom rest 45 to pivot about a vertical axis point P2 in the directions of arrow A2 (FIG. 2). A distal end of swivel assembly 41 is connected to a collar 53, as best seen in FIG. 4, that supports a pivot pin 55. Pivot pin 55 allows boom rest 45 to pivot about point P3 in the directions of arrow A3 (FIG. 1). In other configurations, other pivot points could be added to tower 3 to provide other axis of rotation. For example, a left/right (starboard/port) pivot may also be desired and implemented by swivel assembly 41. It is contemplated that in some embodiments, a ball joint type of pivot assembly may be used in place of swivel assembly 41.

Boom rest 45 is formed out of rigid material that in the exemplary configuration includes inner support beams 57, elongated cross-members 59, and elongated boom attachment beams 61. Center portions of the pair of inner support beams 57 are rigidly connected to collar 53 and cross-members 59, as illustrated. Cross-members 59 are rigidly connected to elongated boom attachment beams 61, as illustrated. Notches 63 are formed near each end of elongated support beams 61. As discussed further later, notches 63 are capable of accepting cross-members at or near the distal end of the boom when attached to tower 3. In other embodiments, beams 61 may have additional notches so that cross-members of different-sized booms may be attached to beams 61, and it may not be necessary to use all notches 63 when a boom is attached to beams 61. Other embodiments contemplate adjustable beams 61 that may be moved relative to each other and/or locked into place to allow one set of beams to be sized for different-sized booms.

Having described the components of crane dolly 1, its use and operation are now described. Initially, a vehicle will tow crane dolly 1, using front tongue 9, to a location where crane dolly 1 is needed. Next, it is maneuvered so that tower 3 is located under a rear portion of a folded-up crane boom extending from a main towing vehicle. Tower 3 may be slid back and forth in the directions of arrows A1 (FIG. 1) to accurately position boom rest 45 before attaching a boom to it. Once positioned, a crane boom 100 may be lowered toward boom rest 45 and crane boom cross-members 102, 104 are guided into notches 63. Attachment mechanisms (not shown) may be used to secure crane boom 100 to boom rest 45 so that crane boom 100 and crane dolly 1 do not become separated during transportation. Once secured together the crane with its crane boom 100 is transport to where it is needed. During transportation, the tongue 9 remains attached to the towing vehicle so that the tongue 9 is performing the towing and the crane dolly 1 is primarily supporting the weight of an end of the crane boom 100 that it is attached to. While being transported, pivot P2 allows crane dolly 1 to pivot about a vertical axis in the direction of arrow A2, as seen in FIG. 2, and pivot P3 allows crane dolly 1 to pivot about a generally horizontal axis in the direction of arrow A3, as seen in FIG. 1. As mentioned above, there may be other pivot points and in some embodiments, a universal ball joint may replace pivots P2 and P3. In some configurations, during transportation, wheels 39 may allow tower 3 to have some back-and-forth movement, if that is desired. It is contemplated that wheels 39 may have some friction devices that allows them to rotate while preventing them from rapidly "free-wheeling" back and forth during transportation of a crane. In other embodiments, it is further contemplated that locking mechanism(s) on wheels 39 and/or tower may secure tower 3 to frame 5 when back-and-forth movement of tower 3 is undesired during transportation, such as when a boom is not attached to tower 3. After reaching a destination, crane dolly 1 may be detached from crane boom 100 and towed to another location using front tongue 9.

Example methods may be better appreciated with reference to flow diagrams. While for purposes of simplicity, explanation of the illustrated methodologies are shown and described as a series of blocks. It is to be appreciated that the methodologies are not limited by the order of the blocks, as some blocks may occur in different orders and/or concurrently with other blocks from that shown and described. Moreover, less than all the illustrated blocks may be required to implement an example methodology. Blocks may be combined or separated into multiple components. Furthermore, additional and/or alternative methodologies may employ additional, not illustrated blocks.

Figure 7:
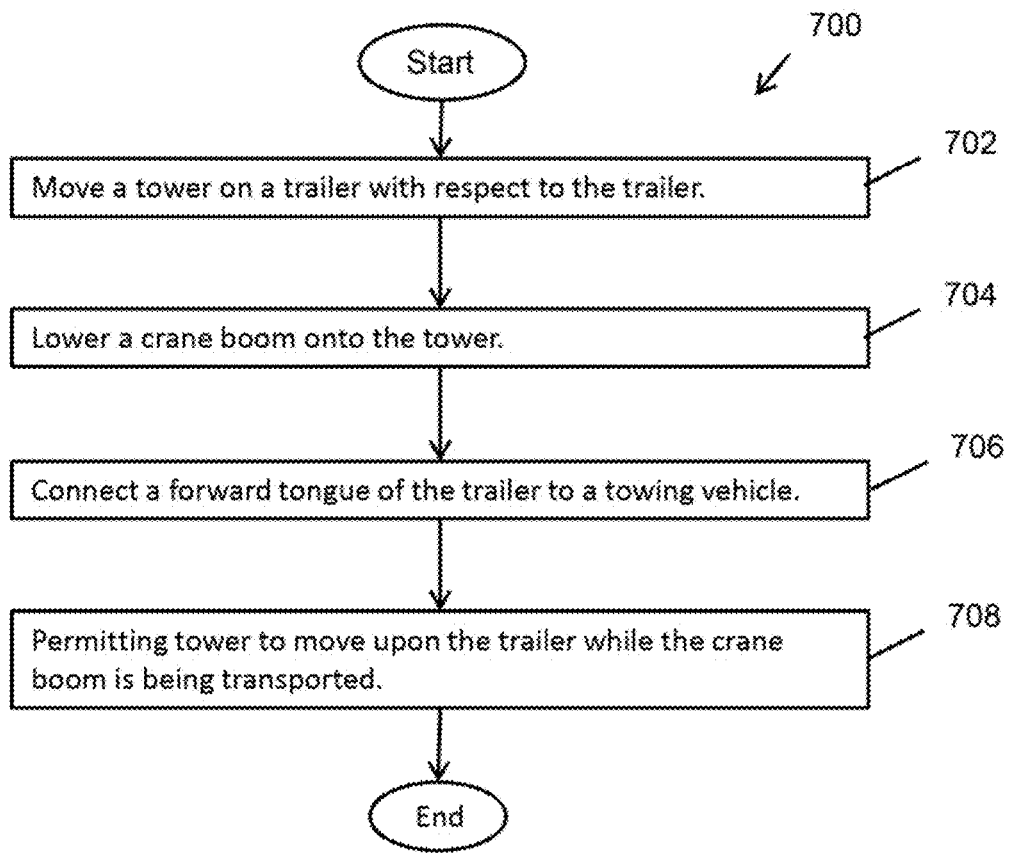
FIG. 7 illustrates an example flow diagram of placing a portion of a crane boom onto a crane dolly.

FIG. 7 illustrates a method 700 of using a crane boom dolly. The method begins by moving a tower on a trailer, at 702, relative to the trailer. For example, the tower may be moved by rolling it on wheels as discussed above, or it may be slid, positioned with moving chains and/or gears pulling/pushing the tower, or moved in another way as understood by those of ordinary skill in the art. Once positioned, a crane boom is lowered onto the tower, at 704. In some configurations, the method will lock the crane boom to the tower. As discussed above, the tower may permit the crane boom to rotate about one or more pivot points. A forward tongue of the trailer is connected to a towing vehicle, at 706, and remains connected to the towing vehicle while the crane boom is being transported. The tower is permitted to move upon the trailer, 708, while the crane boom is being transported.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation.

What is claimed is:

1. A crane dolly comprising:
   a trailer with a frame and a front tongue, wherein the front tongue is adapted to be adjusted to different lengths;
   a tower on the trailer movable independent of the trailer; and
   a boom rest on top of the tower adapted to receive a portion of a crane boom, wherein the boom rest is adapted to pivot with respect to the tower about a first pivot point and about a second pivot.

2. The crane dolly of claim 1 further comprising:
   a rear bumper; and
   wheels pivotally attached to a lower portion of the tower and adapted to allow the tower to roll back and forth between the front tongue and the rear bumper.

3. The crane dolly of claim 1 wherein the frame further comprises:
   at least parallel elongated main beams running from a rear bumper forward toward the front tongue; and cross-members located between the main beams and rigidly connected to the main beams.

4. The crane dolly of claim 2 wherein the frame further comprises:
   at least parallel elongated main beams running from the rear bumper forward toward the front tongue; and cross-members located between the main beams and rigidly connected to the main beams;
   a pair of parallel elongated rails attached to the frame; and
   bumpers attached at both ends of the pair of elongated rails wherein the wheels of the tower travel on upper surfaces of pair of parallel elongated rails.

5. The crane dolly of claim 4 further comprising:
   a rigid wheel tab rigidly attached to a lower portion of the tower; and
   a lower wheel pivotally attached to a bottom portion of the rigid wheel tab so that the lower wheel rolls along a lower surface of one of the pair of parallel elongated rails preventing the tower from being pulled upward and away from the at least one of one of the pair of parallel elongated rails.

6. The crane dolly of claim 1 wherein the tower is A-shaped as viewed from the starboard and ports sides of the crane dolly.

7. The crane dolly of claim 6 wherein the tower further comprises:
   front and back plates formed with a plurality of openings to reduce weight and wind resistance of the crane dolly without compromising strength;
   side plates forming the A-shaped sides of the tower formed with central openings to reduce weight and wind resistance of the crane dolly without compromising strength, wherein side edges of the front and back plates are recessed inside of side edges of the side plates where the front plate and sides plates are rigidly connected together and where the back plate and sides plates are rigidly connected together;

a top plate attached to a top of the side plates, front plate, and back plate;
a bottom plate rigidly connected to both side plates and formed with a central opening to reduce weight and wind resistance of the crane dolly without compromising strength.

8. The crane dolly of claim 7 wherein the top plate overlaps side plates as well as front and back plates and top plate is rigidly connected to side plates, front plate, and back plate.

9. The crane dolly of claim 1 further comprising:
a top plate attached to a top of the tower;
a support mechanism attached to the top plate; and
a swivel assembly attaching the support mechanism and having a vertical shaft that boom rest is slid through when mounted to the swivel assembly, wherein the vertical shaft allows the boom rest to rotate about the vertical shaft in clockwise and counter clockwise directions.

10. The crane dolly of claim 9 further comprising:
a collar near a center portion of the boom rest is connected to the distal end of the swivel assembly; and
a horizontal pivot pin at 90 degrees is supported by the collar and allows the boom rest to pivot about the horizontal pivot pin.

11. The crane dolly of claim 1 wherein the boom rest further comprises:
elongated boom attachment beams;
elongated cross-members rigidly attached between the elongated boom attachment beams;
inner support beams rigidly attached to the elongated cross-members and pivotally attached to a horizontal pivot pin; and
a plurality of notches formed in the elongated boom attachment beams adapted to receive crane boom cross-members and adapted to allow a portion of the crane boom to be secured to the boom rest.

12. The crane dolly of claim 1 wherein the front tongue remains attached to a towing vehicle when the crane dolly is transporting the crane boom.

13. The crane dolly of claim 1 wherein one or more of the group of: wheel assemblies, a brake assembly, a bumper, lights, a mud flap is attached to the frame.

14. The crane dolly of claim 1 wherein the tower, boom rest, frame, and front tongue are formed out of rigid pieces of metal.

15. A trailer comprising:
a tower frame located on the trailer and adapted to move between a front end and a rear end of the trailer;
a front tongue connected to the trailer and adapted to remain attached to the trailer when the trailer is transporting a crane boom; and
a boom rest attached to a top of the tower frame and adapted to move with respect to the tower frame, the boom rest comprising at least a pair of elongated boom attachment beams adapted to receive at least one cross-member of the crane boom.

16. The trailer of claim 15 further comprising:
a rear bumper attached to rear portion of the trailer; and
wheels pivotally attached to a lower portion of the tower frame and adapted to allow the tower frame to roll back and forth between the front tongue and the rear bumper.

17. The trailer of claim 16 further comprising:
a pair of parallel elongated rails attached to the trailer, and
bumpers attached at both ends of the pair of elongated rails, wherein the wheels of the tower frame travel on upper surfaces of the pair of parallel elongated rails.

18. The trailer of claim 17 further comprising:
a rigid wheel tab rigidly attached to the lower portion of the tower frame; and
a lower wheel pivotally attached to a bottom portion of the rigid wheel tab so that the lower wheel rolls along a lower surface of one of the pair of parallel elongated rails preventing the tower from being pulled upward and away from the at least one of one of the pair of parallel elongated rails.

19. The trailer of claim 15 further comprising:
a universal joint connected between the top of the tower frame and the boom rest.

20. A method of using a crane boom dolly comprising:
moving a tower on a trailer relative to the trailer in preparation for the tower to receive a crane boom;
lowering the crane boom onto a boom rest attached to a top of the tower and locking the crane boom to the boom rest, the boom rest comprising at least a pair of elongated boom attachment beams adapted to receive at least one cross-member of the crane boom;
connecting a forward tongue of the trailer to a towing vehicle, wherein the forward tongue remains connected to the towing vehicle while the crane boom is being transported; and
permitting the tower to move upon the trailer while the crane boom is being transported.

* * * * *